Figure 1:
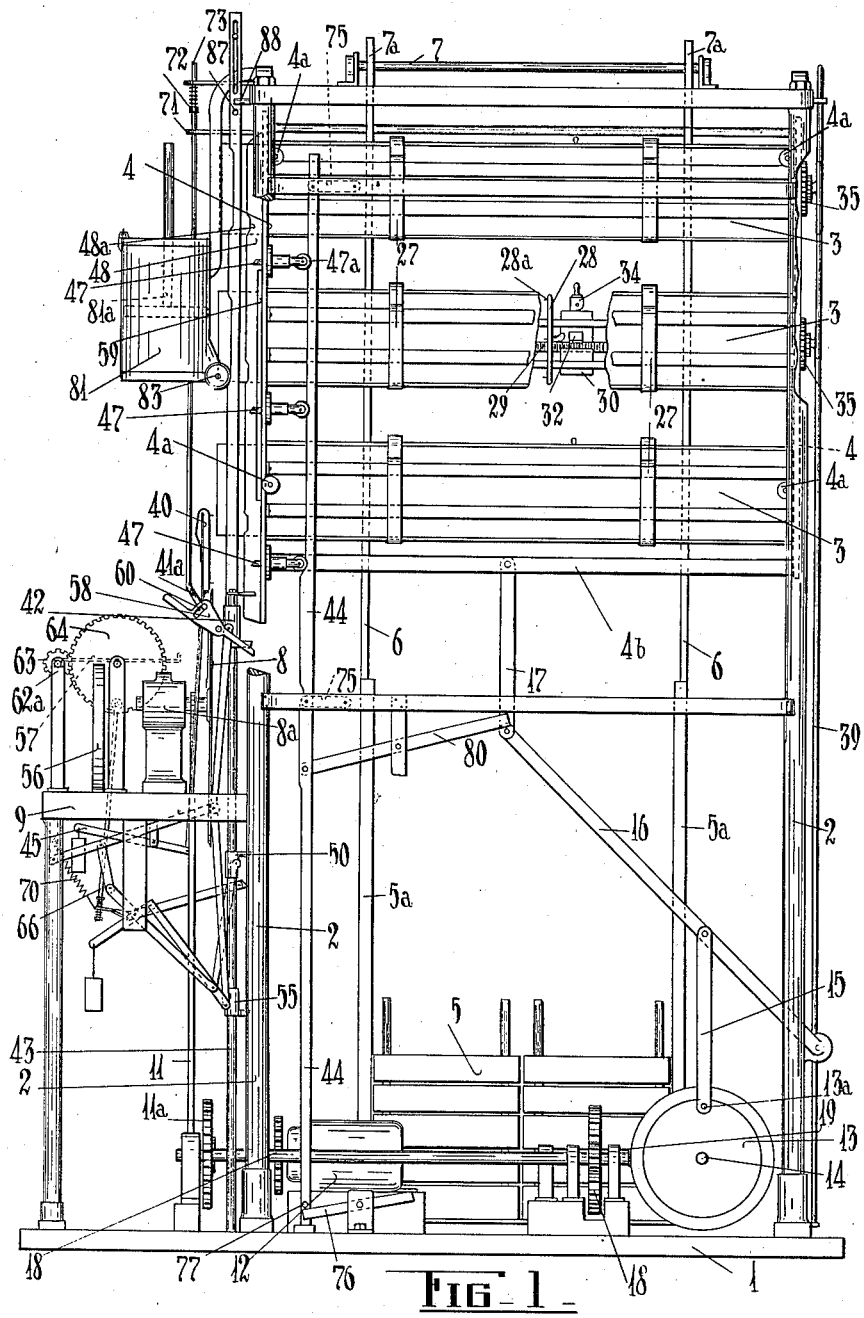

Sept. 22, 1936.  W. ALLOO  2,055,398
FOOD SLICING AND SANDWICH MAKING MACHINE
Filed April 26, 1935  4 Sheets-Sheet 1

Inventor:-
William Alloo
by S. L. [signature]
Atty.

Sept. 22, 1936.  W. ALLOO  2,055,398
FOOD SLICING AND SANDWICH MAKING MACHINE
Filed April 26, 1935  4 Sheets-Sheet 2
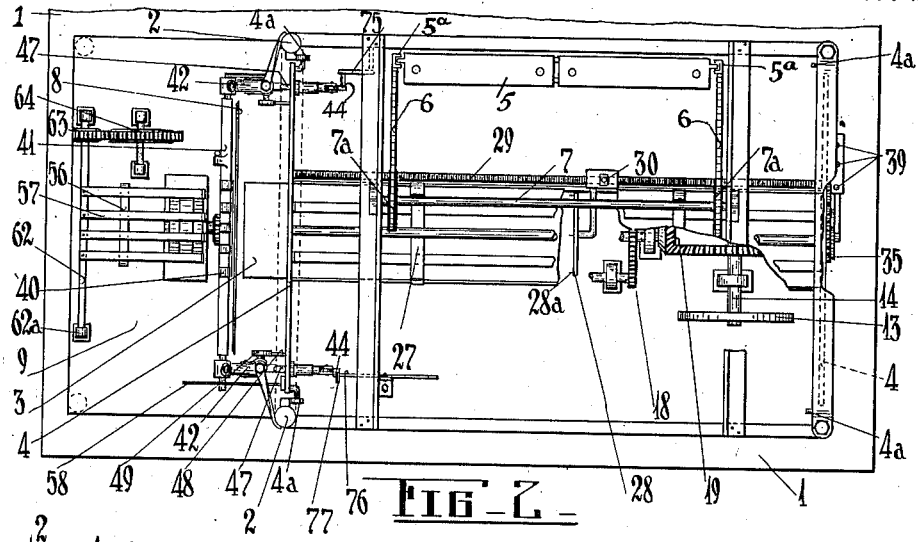
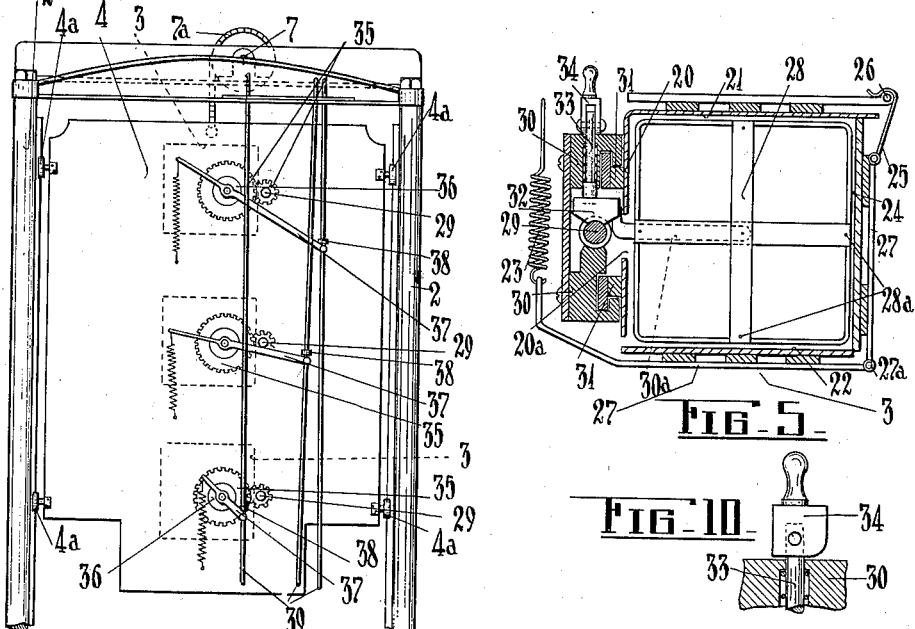
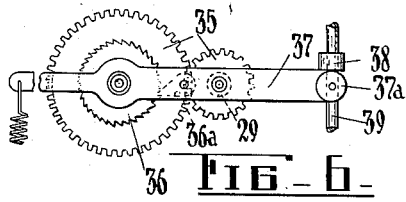
Inventor:-
William Alloo Sept. 22, 1936.  W. ALLOO  2,055,398
FOOD SLICING AND SANDWICH MAKING MACHINE
Filed April 26, 1935  4 Sheets-Sheet 3
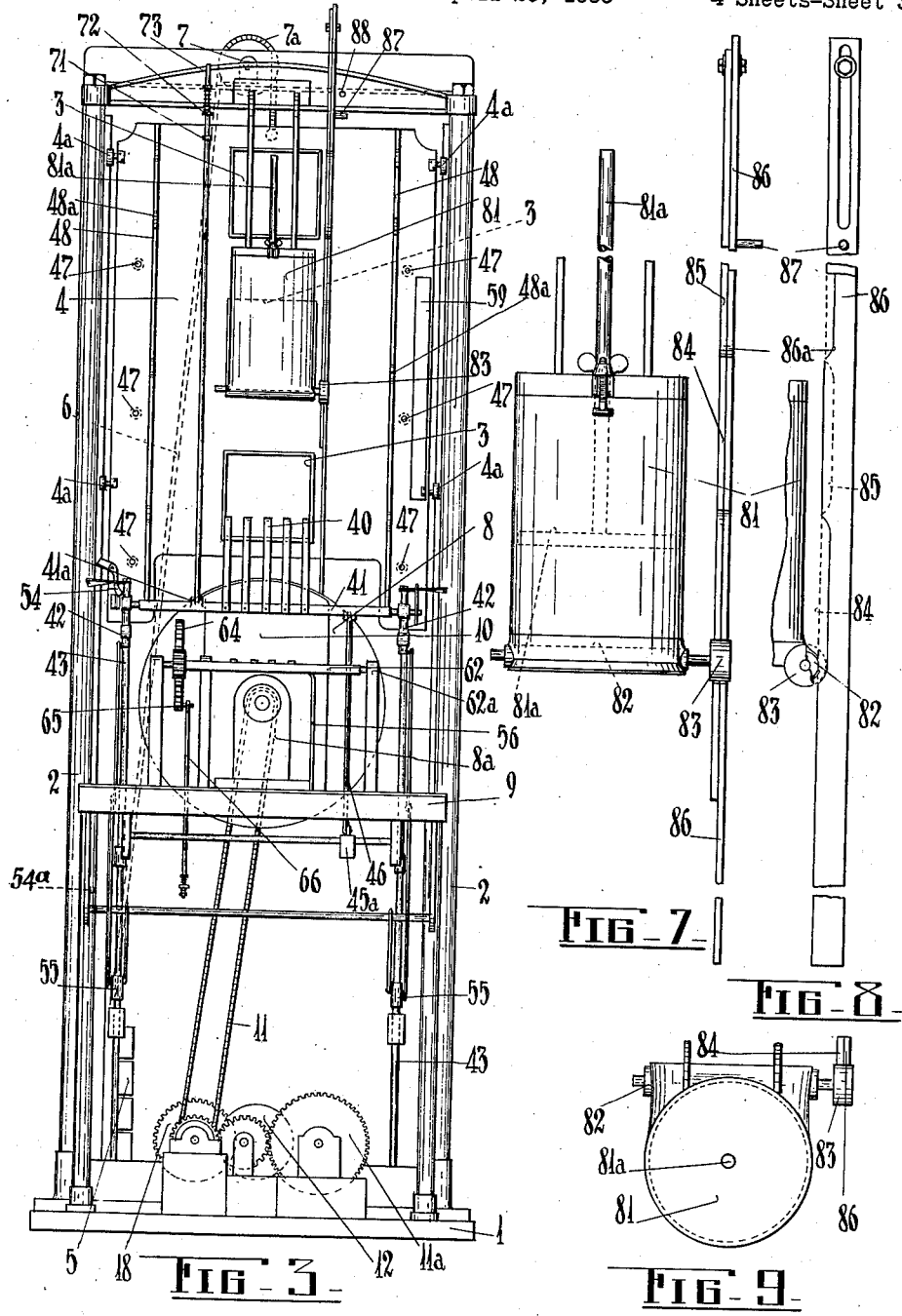

Sept. 22, 1936.    W. ALLOO    2,055,398
FOOD SLICING AND SANDWICH MAKING MACHINE
Filed April 26, 1935    4 Sheets-Sheet 4
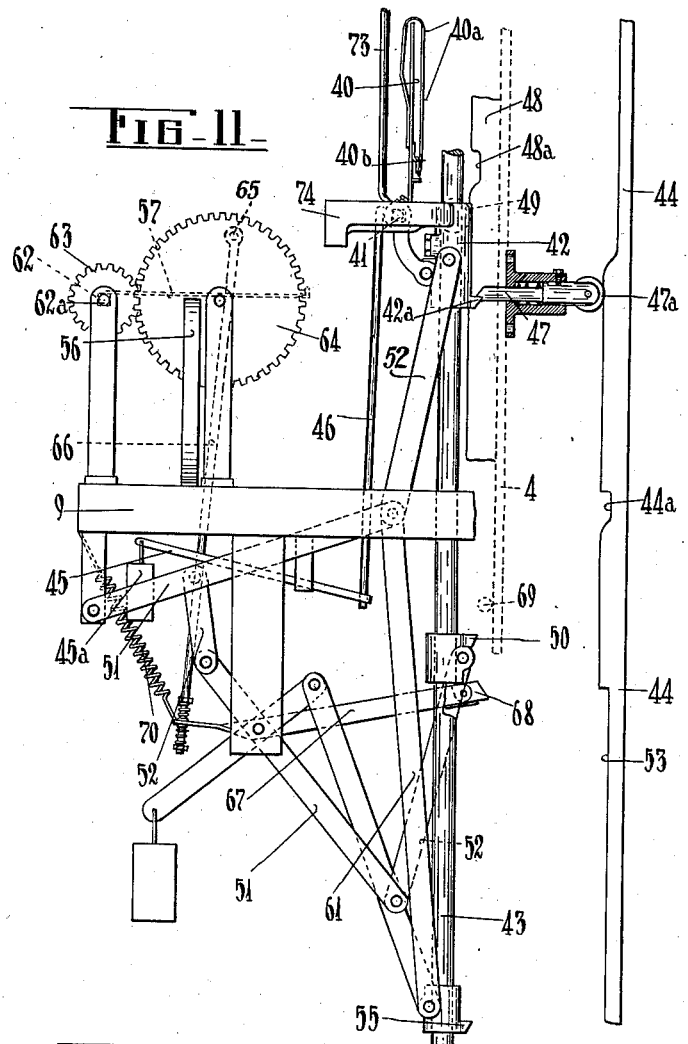
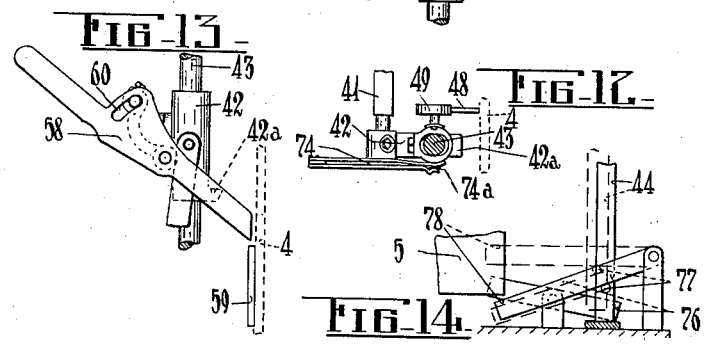

Patented Sept. 22, 1936

2,055,398

UNITED STATES PATENT OFFICE 2,055,398

FOOD SLICING AND SANDWICH MAKING MACHINE

William Alloo, Dunedin, New Zealand

Application April 26, 1935, Serial No. 18,440
In New Zealand May 12, 1934

27 Claims. (Cl. 107—1)

The invention relates to machines for cutting and slicing bread, bacon, cooked foods and the like, which are put up in a form suitable for slicing, and has for its object the provision of an improved machine adapted not only to slice said foodstuffs, but which is also capable of dealing with the resultant slices and putting them together to form sandwiches.

It is known in connection with food slicing machines to provide a reciprocating food holder which operates in conjunction with a rotary cutter, the food being fed forward prior to reaching said cutter so that upon being passed on to the cutter, said food has a slice severed therefrom.

In this known type of machine there is no provision for holding the slices during formation, with the result that during the cutting or slicing operation, particulary when thin slices are being formed, the portions being severed from the bulk crumple and fall towards and on to a platform provided to receive them. This necessitates sorting and straightening out of slices and is also responsible for waste in broken slices when the latter are being cut for making sandwiches. Furthermore, there is no provision for delivering the cut slices from the machine.

The improved machine put forward by this invention with the object of overcoming the beforementioned and other disadvantages, comprises a rotary food cutter; a reciprocating holder for food to be sliced, operating in conjunction with said cutter; travelling fingers adapted to grip and hold the portion of the food being cut from the bulk thereof; and means actuated from said holder for causing the fingers to travel with the latter during the slice forming operation and to be returned to their starting position at the completion of the formation of the slice.

The improved machine further comprises a series of food holders arranged to be successively passed to the cutter so that slices will be severed from the food held therein, the severed slices being in turn gripped and held by the travelling fingers and combined to form a sandwich.

Further still, the improved machine provides for the application of butter or the like to the food, by the use of means adapted to apply said butter or the like to the food before it is sliced, said means, when the machine is used for forming sandwiches, being arranged to apply butter to the food contained in the second and third holders only, butter not being applied to the food in the first holder.

In order however, that the invention may be better understood it will be particularly described in conjunction with the accompanying drawings which show in detail a machine constructed for making sandwiches.

In the drawings:—

Figure 1 is a side elevation of the improved machine,

Figure 2 a plan view (with a butterer removed) and

Figure 3 a front elevation thereof, while

Figure 4 is a part rear elevation of said machine,

Figure 5 a cross sectional view (enlarged) of one of the food containers or holders, Figure 6 a detail view of the gearing for actuating the feed screw of a food container or holder, Figure 7 a front view and Figure 8 a side view (both views enlarged) of the means for controlling the action of the butterer, Figure 9 a plan view of the butterer, Figure 10 a detail view of the eccentric for putting the plunger or pusher in a food container or holder into gear with or for releasing the same from the feed screw of the latter, Figure 11 a detail view in elevation, illustrating the gearing for actuating the two sets of fingers which handle the slices cut from the food, form the sandwiches and deliver the latter from the machine, Figure 12 a plan view of part of the mechanism illustrated in the last-mentioned view, Figure 13 a detail view in elevation of the means for actuating the sandwich holding fingers to cause the latter to be brought to a position for delivery from the machine, Figure 14 a detail view in elevation of the means for putting the cam bar at the opposite side of the machine to that shewn in Figure 1 into and out of the operative position.

As illustrated in the drawings, the improved machine comprises a base 1, from which rise columns or pillars 2, stayed and secured together to provide a frame in which operate alternately downwards and upwards, a number of food containers or holders 3 mounted in vertical alignment in front and back plates 4, the latter being provided with friction rollers or wheels 4a, which bear against the aforesaid columns or pillars 2, said containers or holders 3 and the front and back plates 4, moving as a single unit.

The food containers or holders 3, and the front and back plates 4, are counterbalanced by weights 5, the ends of the support for which are entered in vertical guides 5a on the machine frame. The chains 6 which connect the weights 5 with the containers or holders 3 passing over sprocket wheels 7a keyed on the same shaft 7 at the top of the frame of the machine so that said food containers or holders 3 are at all times maintained in a horizontal position.

A circular knife 8 having its axis horizontal, and in vertical alignment with the horizontal axes of said food containers or holders 3, is mounted in bearings 8a on a platform or table 9 at the front of the machine frame, and so as to be adjacent the front ends of the said containers or holders 3 as they travel alternately downwards and upwards in the aforesaid frame, the front ends of the containers or holders 3 extending through the front plate 4 to pass in close proximity to the circular knife 8, which is rotated behind a shield or guard 10, through gearing such as a chain and sprocket drive 11, and reduction gearing 11a, from a prime mover 12 preferably an electric motor located on the base 1 of the machine.

Means for imparting vertical movement to the food containers or holders 3 and the front and back plates 4 in the frame, comprise crank discs 13 (Figures 1 and 2) on a cross shaft 14 on the base 1, crank rods 15 connected to crank pins 13a on said discs 13 and also to levers 16 pivoted at one end to the machine frame, and at the other end to arms 17 pivotally connected to connecting bars 4b between the front and back plates 4 which support the containers or holders 3, the shaft 14 of said discs 13 being operated through reduction gearing 18, and spur and bevel gearing 19 from the prime mover 12.

Each food container or holder 3 (see Figure 5) consists of two sides, a top, and a bottom, of sheet metal re-inforced with spaced bars the latter extending between the front and back plates 4, one side 20 and the top 21 of each container or holder 3, being permanently secured to said front and back plates 4, while the portion of the bottom 22, between the end plates 4, is spring suspended as at 23 at one edge, from cross bars between the front and back plates 4, the opposite edge of said portion of the bottom 22 being hinged at 27a to the portion of the remaining side 24 between the end plates 4, the upper edge of the hinged portion of the side 24, being provided with spring clips 25 adapted to engage projections 26 on the container or holder top 21, for the purpose of closing the container or holder 3 on and gripping food placed therein.

Preferably the containers or holders 3 are provided with straps 27 in which are incorporated the hinges 27a aforesaid, and to which the clips 25 and spring suspension means 23 are attached.

Means for feeding the food held in a container or holder 3 along same to project beyond the cutting plane of the circular knife 8 to an extent sufficient to enable a slice of the desired thickness to be severed from the food held in said container or holder 3, comprise a plunger or pusher 28 (Figures 1, 2 and 5) with spikes 28a thereon and conforming more or less to the interior cross sectional shape of the container or holder 3.

This plunger or pusher 28 is placed behind the food in the container or holder 3, and is worked along same towards the front end thereof by means of a screw 29, (Figures 1, 2, 4, 5 and 6) mounted externally of the fixed side 20 of the container or holder 3, and held against travel endways, said plunger or pusher 28 being mounted on an arm 30a, which extends through a slot 20a in said fixed side 20, into the container or holder 3 from a shoe or fitting 30, supported by and adapted to travel along rails or bars 31 between the front and back plates 4 beforementioned.

The shoe or fitting 30 aforesaid contains a split nut 32, the upper portion of which is capable of being raised and lowered to release its grip of, and to grip the screw 29 respectively as required, when setting the plunger or pusher 28 in the desired position in the container or holder 3.

Means for raising and lowering the upper portion of the split nut 32, comprise a spring actuated rod 33 connected thereto and also to a cam 34 (Figures 1, 5 and 10) on the shoe or fitting 30, and according to which radius of the cam 34 is brought to the vertical position, so is the nut 32 released from or caused to grip the screw.

Turning movement is imparted to the screw 29 to cause the plunger or pusher 28 to travel along same towards the front of the foot container or holder 3 per medium of toothed gear wheels 35 (Figures 1, 2, 4 and 6) at the back end of the container or holder 3, said gear wheels 35 being operated through pawl and ratchet gear 36 (Figures 4 and 6) towards the completion of upward movement of the containers or holders 3 and the front and back plates 4 in the frame.

In order to operate the aforesaid gear wheels 35, the pawls 36a of the ratchet gear 36, are carried by spring returned levers 37, which pivot about the axes of the ratchet wheels, said levers 37 having thereon pivotal fittings 37a slidable on vertical rods 39 held in keepers at the rear of the machine, said fittings 37a being adapted to engage stops 38 on the rods 39 as the containers or holders 3 and the plates 4 travel upwards, whereby the ratchet wheels are given a predetermined amount of turning movement to turn the gear wheels 35, and so impart turning movement to the screws 29. The stops 38 are adjustable on the vertical rods 39, to provide for variation in the feed of the pushers or plungers 28, whereby slices of different thicknesses may be cut from the food in the containers or holders 3.

As a container or holder 3 with food held therein and projecting from its front end, travels downwards, the projecting food passes on to the circular knife 8 and is severed therefrom in a slice, the thickness of which is determined by the amount of projection of the food from the container or holder 3.

It will be appreciated that the slice being severed from the food, must be kept as close up to the knife 8 as possible, and must also move downwards with, and at the same rate of travel as the food in the container or holder 3, if a non-mutilated or non-deformed severed slice is to be obtained.

In order to provide for holding the slice being severed as close up to the knife 8 as possible during the severing operation, and also to receive same when completely severed, there is provided a series of spaced spring fingers 40, mounted on cross bar 41, carried by pivotally jointed fittings 42 slidable on vertical rods 43 a fixture at the front of the machine (Figures 1, 2, 3 and 11).

These spring fingers 40 (see Figure 11) consist of doubled flat spring material extending vertically from the bar 41, and with springs 40b between their lower portions, the spring formation being provided to allow for variation in the thicknesses of the slices cut or severed from the food projecting from the containers or holders 3.

The portions of the spring fingers 40 presented to the food, carry spikes 40a, to enter and grip the latter, said fingers 40 being forced up to their work by a balance weight 45a, a lever 45 and a connecting rod 46.

In order to cause the spring fingers 40 to travel downwards with, and at the same rate of travel as the container or holder 3 from the food in which a slice is being cut or severed, there are provided on the front plate 4, spring and cam actuated catches 47 (Figures 1, 2, 3 and 11) there being two catches 47 in respect of each container or holder 3, said catches 47 being located one at each side of the latter, and in positions so that as the container or holder 3 travels downwards, said catches 47 are caused to engage projections 42a from the aforesaid pivotally jointed fittings 42 slidable on the vertical rods 43, so as to draw downwards the bar 41 carrying the spring fingers 40 which grip and hold the slice during the time it is being cut, and after it is completely severed from the food in the container or holder 3.

The means for causing the aforesaid catches 47 to engage the projections 42a from the pivotally jointed fittings 42 slidable on the vertical rods 43, comprise vertical cam bars 44 (Figures 1, 2, 11 and 14) located behind the front plate 4, one at each side of the containers or holders 3, and adapted to be brought into position for use, and to be put out of position or rendered inoperative, as will be hereinafter described.

The spring and cam actuated catches 47 on the front plate 4, carry friction rollers 47a at their rear ends, said rollers engaging the cam bars 44 when the latter are in the operative positions and as the containers or holders 3 and the front and back plates 4 descend. The cam bars 44 are formed with recesses 44a therein, and when the rollers 47a on the catches 47 are entered in the latter, said catches 47 are retracted by their springs and fail to engage the projections on the fittings 42 which carry the finger-bar 41.

There are also provided on the outer side of the front plate 4, vertical bars 48 with recesses 48a therein, (Figures 2, 3, 11 and 12) to receive rollers 49 on the aforesaid pivotally jointed fittings 42, the latter containing elongated holes (Figure 12) to enable them to have movement on the vertical rods 43 towards and from the front plate 4.

Assuming the cam bars 44 to be in position for use and food projecting from a container or holder 3 about to be passed downwards to the knife 8, the action of the machine is as follows:—

Upon the food commencing to pass downwards to the knife 8, the spring fingers 40 with the spikes 40a extending therefrom, are pressed against the projecting end of the food, and grip same under the action of the balance weight 45a acting on said fingers 40, which are permitted to move towards and against the food, by the elongated holes in the fittings 42 slidable on the vertical rods 43, and also by the rollers 49 on said fittings 42 passing into appropriate recesses 48a in the bars 48 on the front plate 4.

At the same time the rollers 47a of the catches 47 on the front plate 4, related to the container or holder 3 of the food being dealt with, run on to raised or projecting surfaces of the cam bars 44, and force the catches 47 forward against the action of their springs and through the front plate 4, to engage the projections 42a on the pivotally jointed fittings 42 slidable on the vertical rods 43, and as the result of which the bar 41 carrying the spring fingers 40 with the latter gripping or applied to the projecting end of the food, is drawn downwards with and at the same rate of travel as the container or holder 3 and the food therein, said container or holder 3 and fingers 40 continuing to move downwards, with the food passing over the knife 8 and the guard 10 thereof until a slice is completely severed or cut from the food, and is held solely by the spring fingers 40.

When making sandwiches, it is necessary that the first severed slice which is cut from a loaf of bread in the lowermost container or holder 3, be returned to the starting position to receive a slice of meat to be cut from meat in the intermediate container or holder 3 next above, and later it is necessary that said slice of bread with the slice of meat, be returned upwards to receive a further slice of bread to be cut from a loaf of bread in the uppermost container or holder 3, to form the sandwich, the return movement being obtained as follows:—

Also slidable on the same vertical rods 43 as the pivotally jointed fittings 42 which support the bar 41 carrying the spring fingers 40, are further fittings 50 connected through levers 51 and rods 52, with the fittings 42 aforesaid, said levers 51 and rods 52 being pivoted and connected so that downward movement of said further fittings 50 imparts upward movement to the fittings 42.

At the completion of the severing of a slice from the bread in the lowermost container or holder 3, the rollers 47a of the catches 47 in the front plate 4, related to the lowermost holder or container 3, pass into recesses or depressions 44a in the cam bars 44 (Figures 1 and 11), with the result that said catches 47 become disengaged from the projections 42a from the fittings 42 which support the finger carrying bar 41, and as soon as said catches 47, owing to continued downward movement of the front plate 4, pass said projections 42a, they are immediately forced forward again by their rollers 47a running on further raised or projecting surfaces of the cam bars 44, whereby said catches 47 engage the further fittings 50 before referred to, and by drawing same downwards impart through the levers 51 and rods 52, reverse or upward movement to the finger carrying bar 41, and raise the fingers 40 with the severed slice attached, to the position it occupied at the commencement of the slicing operation by the knife 8 of the bread in the lowermost container or holder 3, the rollers 47a of the catches 47 related to the food container or holder 3 just dealt with, then running into shallow portions 53 of the cam bars 44 so as to be out of action for the remainder of the cycle of operations, in course of performance.

In sandwich making, the intermediate container or holder 3, or that container or holder 3 next above, with the meat projecting therefrom, then moves down to the knife 8 and the already severed slice of bread held by the fingers 40, is applied to the projecting end of the meat, whereupon a slice of meat is severed from the bulk of the latter, travels downwards with the cut slice of bread, and is returned upwards again with the latter in a similar manner, and by the same means as those described in connection with the first cut slice of bread. To complete the formation of the sandwich, the remaining or uppermost container or holder 3 with bread projecting therefrom, travels down to the knife 8 and has the already severed slice of bread and slice of meat applied to the end of the bread in said remaining or uppermost container 3, following which the last required slice is severed from the bread in the latter, and travels downwards with the fingers 40 and the previously severed slices, which completes the formation of the sandwich.

The completed sandwich is returned upwards by the spring fingers 40, to the raised position of the latter, by a hooked catch 54 (Figure 3) on the front plate 4 engaging a lower fitting 55 slidable on one of the vertical rods 43 aforesaid, upon the front plate 4 commencing its return or upward movement, said fitting 55 being connected by a rod 61, and one of the rods 52 with the pivotally jointed fittings 42 carrying the finger supporting bar 41.

Upon the spring fingers 40 with the completed sandwich thereon, reaching the raised position, said fingers 40 are swung outwards from the front plate 4 and brought to a position of rest upon a supporting bar 56 (Figures 1, 2, 3 and 11) so as to alternate with further spaced fingers 57 also resting on said bar 56, the swinging over operation of the spring fingers 40 being brought about as follows:—

A slotted lever 58 (Figures 1 and 13) pivoted on one of the pivotally jointed fittings 42 which carry the finger supporting bar 41, is engaged by the end of a raised strip 59 (Figures 1, 3 and 13) on the front plate 4, as the latter travels upwards, and owing to the slot 60 in said lever 58 being passed upon an end of the finger supporting bar 41, the latter is caused to be thrown outwards and downwards from the front plate 4, to bring the spring fingers 40 with the sandwich thereon, to its position of rest on the bar 56, and to hold same in the latter position until the sandwich is picked "off" the spring fingers 40 by the second set of fingers 57 beforementioned. The slot 60 in the lever 58 permits the latter to be operated by the raised strip 59 as the front plate 4 moves downwards without operating the bar 41.

The fingers 57 of the second set are mounted on a horizontal bar 62 (Figures 1, 2, 3 and 11) turnable in bearings 62a on the platform or table 9 at the front of the machine, said bar 62 having on one end a toothed pinion 63 which meshes with a further toothed wheel 64, a crank pin 65 on which is connected by a rod 66 with the front end of a lever 67 pivoted below the platform or table 9, the rear end of said lever 67 being provided with a spring trigger 68, past which a projection 69 on the front plate 4 slips as the latter travels downwards. Upon the front plate 4 moving upwards however, the projection 69 engages below the trigger 68 and by imparting movement to the lever 67, operates the toothed wheels 63, 64 to cause the second set of fingers 57 to swing upwards and outwards, so that they pass between the spring fingers 40, and pick the sandwich "off" same, and deposit it on a table or in a receptacle placed to receive it. After delivering the sandwich the second set of fingers 57 is returned to its original position by one or more return springs 70.

Upon the front plate 4 nearing the end of its upward movement, the slotted lever 58 in which the bar 41 of the spring fingers 40 is entered, becomes disengaged from the raised strip 59 owing to the latter clearing said lever, following which a bracket 71 on the front plate 4 engages a stop 72 on a vertical rod 73 (Figures 1 and 3) at the front of the machine, and pulls same upwards, and said rod 73 being connected to an arm 41a on the bar 41 of the spring fingers 40, pulls the latter upwards or returns them to the vertical position again in readiness for use in forming the next sandwich.

A spring clip or catch 74 (Figures 11 and 12) is provided on the outer part of one of the pivotally jointed fittings 42 which carry the finger supporting bar 41, said clip or catch 74 being brought into use to grip a projection 74a on the inner portion of the same fitting and hold the fingers 40 vertical while a sandwich is being made.

The cam bars 44 which are responsible for causing the spring catches 47 to be pushed through the front plate 4 to engage the fittings 42 and 55 slidable on the vertical rods 43 to cause the lowering and raising of the spring fingers 40 during the time they are vertical or during the formation of the sandwich, are in the operative position only during downward travel of the containers or holders 3 and the front and back plates 4, said cam bars 44 during upward travel of the containers or holders 3 and the front and back plates 4, being moved backwards clear of the rollers 47a on the spring catches 47 as the latter travel upwards.

These cam bars 44 are held behind the front plate 4 by pivoted arms 75 from the machine frame and upon the containers or holders 3 and the front and back plates 4 reaching the end of their downward travel, the levers 16 employed in the raising and lowering of said containers or holders 3 and the plates 4, strike the ends of further levers 76 which are mounted one at each side of the machine, so as to engage under projections 77 on the cam bar 44, and move the latter upwards and away from the plate 4 so that they are withdrawn from the path of travel of the rollers 47a on the catches 47 as the latter travel upwards.

The cam bars 44 are returned to their operative positions, that is so that they will be engaged by the rollers 47a of the spring catches 47 on the front plate 4, to force said catches 47 forward, as they travel downwards, upon the containers or holders 3 and the front and back plates 4 reaching the end of their upward travel, at which stage the counterweights 5 depress a lever 78 which engages the pin 77 on one of the cam bars 44, while one of the levers 16 employed in raising and lowering the containers or holders 3 and the front and back plates 4, strikes a lever 80 connected with the other cam bar 44, the result of which is that both cam bars 44 are moved downwards, and towards the plate 4 to a position where their cam surfaces will be in the downward path of travel of the rollers 47a of the aforesaid catches 47.

Up to the present, no mention has been made of the buttering of the slices, and in this connection it is pointed out that butter is not applied to the first slice of bread, but is applied to the end of the meat before a slice is cut therefrom, and also to the end of the uppermost loaf of bread before a slice is cut therefrom, the result when the slices are combined into a sandwich being, butter at each side of the meat, between the latter and the bread at each side.

The butter is contained in a cylinder 81 provided with a discharge aperture in which a horizontal fluted roller 82 operates, said cylinder 81 being pivotally hung on the frame of the machine adjacent the front plate 4, with the roller 82 presented thereto, and located just above the lowermost container or holder 3 when the containers or holders and the front and back plates 4 are fully raised.

The cylinder 81 has therein a plunger 81a which can be operated by hand or by other means, to cause butter to be forced through the discharge aperture to the fluted roller 82 to be applied by the latter to the end of the meat, and the end of the upper loaf of bread in turn as they move downwards.

The fluted roller 82 has mounted on one end, a friction roller 83 (Figures 1, 3, 7, 8 and 9) which bears against a raised track 84 a fixture on the travelling front plate 4, said track 84 containing recesses 85 positioned and of such length that as the meat and the upper loaf of bread in turn approach the fluted roller 82, the friction roller 83 runs in a recess 85 in the track 84 and allows the fluted roller 82 to contact with the meat or the bread as the case may be and apply butter thereto.

In order to keep the fluted roller 82 clear of the meat and the upper loaf of bread as they travel upwards, a vertical sliding bar 86 is mounted on the front plate 4 alongside the fixed track 84, said sliding bar 86 also containing recesses 86a which correspond with the recesses 85 in the raised track 84.

This vertical sliding bar 86 travels upwards and downwards with the front plate 4 and upon the latter with the containers or holders 3 nearing the end of their downward travel, the lower end of the bar 86 strikes the base 1 of the machine or other fixture, and is moved so that its recesses 85a come out of register with the recesses 85 in the track 84 in such a manner that during the whole of the upward travel of the containers or holders 3 and the front and back plates 4, the friction roller 83 runs on a raised track and keeps the fluted butter applying roller 82 clear of the upwardly travelling parts.

Upon the containers or holders 3 and the front and back plates 4 nearing the end of their upward travel, a pin 87 on the sliding bar 86 strikes a stop 88 on the frame of the machine, and causes said bar 86 to be moved so that its recesses 86a again register with the recesses 85 in the raised track 84, so that during downward travel of the container or holders 3 and the front and back plates 4, the butter cylinder 81 can swing inwards by gravity, when required to apply butter to the end of the meat, and to the end of the upper loaf of bread in turn.

What I do claim and desire to obtain by Letters Patent of the United States of America is:—

1. A food slicing machine comprising a food cutter; a reciprocating holder for food to be sliced, operating in conjunction with said cutter; vertically reciprocating travelling fingers adapted to grip and hold the portion of the food being cut from the bulk thereof; and means actuated from said holder to cause said fingers to travel with the latter during the cutting operation, and to return said fingers to their starting position following the completion of the cutting operation.

2. A food slicing machine comprising a food cutter; a plurality of reciprocating holders for food to be sliced, operating in conjunction with said cutter, and adapted to be successively passed thereto; travelling fingers adapted to grip and hold the first portion of food as it is being cut from the bulk thereof in a holder and for combining the cut "off" portions of food to form a sandwich; and means actuated from said holders to cause said fingers to travel with the latter during the cutting of food held thereby and to return said fingers to their starting position.

3. A food slicing machine comprising a food cutter; a plurality of reciprocating holders for food to be sliced, operating in conjunction with said cutter, and adapted to be successively passed thereto; travelling fingers adapted to grip and hold the first portion of food as it is being cut from the bulk thereof in a holder, and for combining the cut "off" portions of food to form a sandwich, means actuated from said holders to cause said fingers to travel with the latter during the cutting of food held thereby, and to return said fingers to their starting position; pivoted fingers adapted to receive the sandwich from the travelling fingers; and means for actuating the latter and the pivoted fingers to cause the delivery of the sandwich from the machine.

4. A food slicing machine as in claim 2, wherein the food holders are mounted in front and rear plates slidable in a frame, to enable them to be alternately passed to, and be moved from the cutter.

5. A food slicing machine, as in claim 2, wherein each food holder has a spring supported bottom and a side hinged thereto adapted to be made to grip food placed in the holder, said hinged side being provided with means for retaining the holder closed.

6. A food slicing machine as in claim 2, wherein each food holder contains a plunger adapted to be made to travel along the holder to cause food contained therein to project therefrom at one end into the plane of the cutter by means of a split nut and a feed screw, the latter being operated through toothed gearing during movement of the holder from the cutter.

7. A food slicing machine as in claim 2, wherein each food holder contains a plunger adapted to be made to travel along the holder to cause food contained therein to project therefrom at one end into the plane of the cutter by means of a split nut and a feed screw, the latter being operated through toothed gearing during movement of the holder from the cutter and wherein the gearing for operating the feed screw, comprises toothed gearing and ratchet gearing, the lever of the latter sliding on a vertical rod, and contacting with an adjustable stop thereon during movement of the food holder from the cutter for the purpose of imparting turning movement to said screw.

8. A food slicing machine as in claim 2, wherein each food holder contains a plunger adapted to be made to travel along the holder to cause food contained therein to project therefrom at one end into the plane of the cutter by means of a split nut and a feed screw, the latter being operated through toothed gearing during movement of the holder from the cutter and wherein the plunger is carried by an arm which extends through a slot in the side of the holder from a shoe adapted to travel along rails on the holder, an eccentric provided on said shoe, being connected with said split nut so that the latter may be engaged with or be disengaged from the feed screw of the holder as required.

9. An improved slicing machine as in claim 2, wherein each food holder comprises a fixed top and a fixed side secured between and to front and rear sliding plates, and a spring supported bottom to which the remaining side is hinged, said top, bottom and sides being reinforced lengthways by bars extending between and secured to said plates; a plunger operable along in said holder from a feed screw, and means for operating the latter.

10. An improved slicing machine as in claim 2, wherein the food holders are mounted between and secured to front and rear plates slidable in a frame, to and from the cutter, said food holders and plates being counterbalanced by weights operating in guides and attached to chains passing over sprocket wheels keyed on the same shaft on the frame in which the plates slide.

11. An improved slicing machine as in claim 2, wherein the food holders are mounted between and secured to front and rear plates slidable in a frame, to and from the cutter, said food holders and plates being counterbalanced by weights operating in guides and attached to chains passing over sprocket wheels keyed on the same shaft on the frame in which the plates slide and wherein the food holders and the front and rear plates are operated in the frame, through crank discs, connecting rods and levers, said discs being operated through gearing from a prime mover in the frame of the machine.

12. An improved slicing machine as in claim 2, wherein the fingers for gripping and holding the portion of food being cut from the bulk thereof in a holder, are spaced on a bar carried by pivotally jointed fittings slidable on vertical rods, said fittings having projections adapted to be engaged by catches on a sliding plate to which the holders are secured and with which they travel.

13. A food slicing machine as in claim 2, wherein the fingers for gripping and holding the portion of food being cut from the bulk thereof in a holder, are spaced on a bar carried by pivotally jointed fittings slidable on vertical rods, said fittings having projections adapted to be engaged by catches on a sliding plate to which the holders are secured and at which they travel and wherein the catches on the sliding plate are spring actuated to project through the latter, and are also provided with rollers adapted to run on cam bars held in an operative position during movement of the holders towards the cutter.

14. A food slicing machine as in claim 2, wherein the fingers for gripping and holding the portion of food being cut from the bulk thereof in a holder, are spaced on a bar carried by pivotally jointed fittings slidable on vertical rods, said fittings having projections adapted to be engaged by catches on a sliding plate to which the holders are secured and at which they travel and wherein the pivotally jointed fittings are connected through rods and levers, with other fittings slidable on the vertical rods in the reverse direction to said pivotally jointed fittings, said further fittings being adapted to be engaged by the catches on the sliding plate after they have become disengaged from the pivotally jointed fittings for the purpose of causing the latter and the bar with the spaced fingers thereon to move from the cutter, while the sliding plate moves towards the latter.

15. A food slicing machine as in claim 2, wherein the fingers for gripping and holding the portion of food being cut from the bulk thereof in a holder, are spaced on a bar carried by pivotally jointed fittings slidable on vertical rods, said fittings having projections adapted to be engaged by catches on a sliding plate to which the holders are secured and at which they travel and wherein the pivotally jointed fittings are connected by rods with lower fittings also slidable on the vertical rods in the same direction as said pivotally jointed fittings, one of said lower fittings being adapted for engagement by a pivoted hooked catch on the sliding plate as the latter moves from the cutter, for the purpose of causing the fingers to also travel from the cutter.

16. A food slicing machine as in claim 2, wherein the fingers for gripping and holding the portion of food being cut from the bulk thereof in a holder, are spaced on a bar carried by pivotally jointed fittings slidable on vertical rods, said fittings having projections adapted to be engaged by catches on a sliding plate to which the holders are secured and with which they travel and wherein said catches on the sliding plate are spring actuated to project through the latter and are also provided with rollers adapted to run on cam bars held in an operative position during movement of the holders towards the cutter and wherein the cam bars are pivotally mounted on arms and are moved into and out of the line of travel of the rollers of the catches on the sliding plate to cause said catches to either engage, or to permit them to clear the fittings slidable on the vertical rods by levers employed in the operation of the food holders and the balance weights contacting with and operating levers pivoted to and engaging said cam bars.

17. A food slicing machine as in claim 2, wherein the fingers for gripping and holding the portion of food being cut from the bulk thereof in a holder, are spaced on a bar carried by pivotally jointed fittings slidable on vertical rods, said fittings having projections adapted to be engaged by catches on a sliding plate to which the holders are secured and at which they travel and wherein the fingers for gripping and holding food being severed from the bulk food, consist of doubled flat spring material with springs between their lower portions.

18. A food slicing machine as in claim 2, wherein the fingers for gripping and holding the portion of food being cut from the bulk thereof in a holder, are spaced on a bar carried by pivotally jointed fittings slidable on vertical rods, said fittings having projections adapted to be engaged by catches on a sliding plate to which the holders are secured and at which they travel and wherein the bar on which the fingers are spaced is carried by portions of the pivotally jointed fittings adapted to pivot on the portions thereof slidable on the vertical rods, one of the last mentioned portions having thereon a projection adapted to be engaged by a spring catch on the portion pivoted thereto.

19. A food slicing machine as in claim 2, wherein the fingers for gripping and holding the portion of food being cut from the bulk thereof in a holder, are spaced on a bar carried by pivotally jointed fittings slidable on vertical rods, said fittings having projections adapted to be engaged by catches on a sliding plate to which the holders are secured and with which they travel and wherein said bars on which the fingers are spaced is carried by portions of the pivotally jointed fittings adapted to pivot on the portions thereof slidable on the vertical rods, one of the last mentioned portions having thereon a projection adapted to be engaged by a spring case on the portion pivoted thereto and wherein the portions of the pivotally jointed fittings slidable on the vertical rods contain elongated holes which pass upon the latter, said portions also carrying rollers which run against tracks containing recesses and mounted on the sliding plate between and to which the holders are secured.

20. A food slicing machine as in claim 2, wherein the fingers for gripping and holding the portion of food being cut from the bulk thereof in a holder, are spaced on a bar carried by pivotally jointed fittings slidable on vertical rods, said fittings having projections adapted to be engaged by catches on a sliding plate to which the holders are secured and at which they travel and wherein the fingers for gripping and holding a portion of food being severed from the bulk thereof, are forced up against the food by weights acting through levers and connecting rods.

21. A food slicing machine as in claim 2, wherein the fingers for gripping and holding the portion of food being cut from the bulk thereof in a holder, are spaced on a bar carried by pivotally jointed fittings slidable on vertical rods, said fittings having projections adapted to be engaged by catches on a sliding plate to which the holders are secured and at which they travel and wherein the fingers for gripping and holding the portion of food being cut from the bulk thereof are forced outwards and downwards from the sliding plate onto a supporting bar by a lever pivoted on one of the pivotally jointed fittings and containing a slot passed upon an end of the finger bar being engaged by a raised strip on the sliding plate as the latter moves from the cutter.

22. A food slicing machine as in claim 2, wherein the fingers for gripping and holding the portion of food being cut from the bulk thereof in a holder, are spaced on a bar carried by pivotally jointed fittings slidable on vertical rods, said fittings having projections adapted to be engaged by catches on a sliding plate to which the holders are secured and at which they travel and wherein the fingers for gripping and holding the portion of food being severed from the bulk thereof are returned to their food gripping and holding position by a rod connected to an arm on the finger bar being actuated by a projection on the sliding plate to pull said fingers upwards.

23. A food slicing machine as in claim 3, wherein the pivoted fingers are spaced along a bar having on one end a toothed pinion which gears with a toothed wheel connected by a rod with a spring returned lever having thereon a trigger adapted to be engaged by a projection on the sliding plate, as the latter moves from the cutter, to cause said fingers to be swung upwards and outwards between the spaced fingers on the bar carried by the pivotally jointed fittings for the purpose set forth.

24. A food slicing machine comprising a cutter; a plurality of reciprocating holders for food to be sliced, operating in conjunction with said cutter and adapted to be successively passed thereto, travelling fingers adapted to grip and hold the first portion of food as it is being cut from the bulk thereof in a holder and for combining the cut off portions of food to form a sandwich; a butter container provided with a discharge aperture containing a horizontal fluted roller hung on the frame so that said roller makes contact with the food in the second and following food holders; and means actuated from the holders to cause said fingers to travel with the latter during the cutting of food held thereby and to return said fingers to their starting position.

25. A food slicing machine as in claim 24, wherein the fluted roller of the butter container has on one end a roller adapted to run on a raised track on the sliding plate, said track containing recesses to permit the butter container to swing inwards in order that the fluted roller will contact with the food in the second and following food holders.

26. A food slicing machine as in claim 24, wherein the fluted roller of the butter container has on one end a roller adapted to run on a raised track on the sliding plate, said track containing recesses to permit the butter container to swing inwards in order that the fluted roller will contact with the food in the second and following food holders and wherein a bar containing recesses corresponding to the recesses in the raised track, is slidable alongside the latter, for the purpose of presenting to the roller a recessed track when the sliding plate moves towards the cutter and an unrecessed track as said plate moves from the latter.

27. A food slicing machine as in claim 24, wherein the fluted roller of the butter container has on one end a roller adapted to run on a raised track on the sliding plate, said track containing recesses to permit the butter container to swing inwards in order that the fluted roller will contact with the food in the second and following food holders and wherein the sliding bar is moved to provide an unrecessed track by its lower end striking a fixture near the finish of movement of the sliding plate towards the cutter, and wherein said bar is moved to provide a recessed track by a pin striking a stop on the machine frame near the finish of movement of said plate away from the cutter.

WILLIAM ALLOO.